US012262231B2

United States Patent
Bedekar et al.

(10) Patent No.: US 12,262,231 B2
(45) Date of Patent: Mar. 25, 2025

(54) IDENTIFYING TRANSIENT BLOCKAGE

(71) Applicant: Nokia Solutions and Networks Oy, Espoo (FI)

(72) Inventors: Anand Bedekar, Glenview, IL (US); Anna Sillanpaa, Jarvenpaa (FI)

(73) Assignee: Nokia Solutions and Networks Oy, Espoo (FI)

( * ) Notice: Subject to any disclaimer, the term of this patent is extended or adjusted under 35 U.S.C. 154(b) by 446 days.

(21) Appl. No.: 17/412,438

(22) Filed: Aug. 26, 2021

(65) Prior Publication Data

US 2022/0070701 A1 Mar. 3, 2022

(30) Foreign Application Priority Data

Aug. 31, 2020 (FI) ..................................... 20205846

(51) Int. Cl.
*H04W 24/08* (2009.01)
(52) U.S. Cl.
CPC .................................. *H04W 24/08* (2013.01)
(58) Field of Classification Search
None
See application file for complete search history.

(56) References Cited

U.S. PATENT DOCUMENTS

| 8,942,128 | B2 | 1/2015 | Gusavac et al. | |
|---|---|---|---|---|
| 9,318,805 | B2 | 4/2016 | Jia | |
| 10,666,339 | B2 * | 5/2020 | Nammi | H04L 1/0009 |
| 10,708,972 | B2 | 7/2020 | Centonza et al. | 76/29 |
| 2012/0294142 | A1 | 11/2012 | Kneckt et al. | 370/229 |
| 2013/0176139 | A1 * | 7/2013 | Chau | E21B 7/30 340/854.4 |
| 2015/0085798 | A1 * | 3/2015 | Lunden | H04W 76/19 370/328 |
| 2015/0195828 | A1 | 7/2015 | Fujishiro et al. | |
| 2016/0174273 | A1 * | 6/2016 | Ginnela | H04L 67/104 455/39 |

(Continued)

FOREIGN PATENT DOCUMENTS

| CN | 102812646 A | 12/2012 |
|---|---|---|
| CN | 109792668 A | 5/2019 |

(Continued)

OTHER PUBLICATIONS

"Mobility robustness optimization in NR", Ericsson, 3GPP TSG-RAN WG3 #104, R3-193057, May 2019, 7 pages.

(Continued)

*Primary Examiner* — Jay P Patel
*Assistant Examiner* — Shehab A Alawdi
(74) *Attorney, Agent, or Firm* — Nokia Technologies Oy

(57) ABSTRACT

Apparatuses and methods in a communication system for identifying transient blockage are presented. Transmission to one or more RAN nodes of parameters for the one or more RAN node is controlled to detect occurrences of sharp channel degradation events in connections served by the node. Data is received from the one or more RAN nodes, the data being related to channel or transmission events related to detected sharp channel degradation in connections served by the node. Based on the received data, likelihood is determined that one or more RAN nodes have a high level of transient blockages.

11 Claims, 9 Drawing Sheets

(56) References Cited

U.S. PATENT DOCUMENTS

| | | | | |
|---|---|---|---|---|
| 2016/0302117 | A1* | 10/2016 | Inoue | H04W 36/08 |
| 2018/0034580 | A1* | 2/2018 | Rost | H04L 1/0003 |
| 2018/0192371 | A1* | 7/2018 | Jung | H04W 68/02 |
| 2019/0068619 | A1 | 2/2019 | Fan et al. | |
| 2019/0181937 | A1* | 6/2019 | Nammi | H04L 1/16 |
| 2019/0238209 | A1 | 8/2019 | Levitsky et al. | |
| 2019/0312923 | A1* | 10/2019 | Rácz | H04W 24/08 |
| 2022/0140882 | A1 | 5/2022 | Matsumura et al. | |

FOREIGN PATENT DOCUMENTS

| | | |
|---|---|---|
| JP | 2009536502 A | 10/2009 |
| JP | 2015089014 A | 5/2015 |
| JP | 2017034680 A | 2/2017 |
| JP | 2019536397 A | 12/2019 |
| WO | WO-2007/130324 A2 | 11/2007 |
| WO | WO-2018/064483 A1 | 4/2018 |
| WO | WO-2018/093916 A1 | 5/2018 |
| WO | WO-2019/138155 A1 | 7/2019 |
| WO | WO-2020/085627 A1 | 4/2020 |
| WO | WO-2020/092752 A1 | 5/2020 |
| WO | WO2020/166079 A1 | 12/2021 |

OTHER PUBLICATIONS

"Report on email discussion on [108#99][V2X] HARQ based TX side RLM/RLF", Interdigital (Rapporteur), 3GPP TSG-RAN WG2#109e, R2-2002074 (Revision of R2-2000543), Mar. 2020, 34 pages.
"Discussion on IAB node discovery and topology/route management", AT&T, 3GPP TSG-RAN WG3 #99, R3-181347, Mar. 2018, 6 pages.
"New SID: Study on data collection further enhancement", 3GPP TSG RAN Meeting #86, RP-19xxxx, Agenda: 9.1.3, CMCC, Dec. 9-12, 4 pages.
Sartori et al., "C5G+ NA&S Project", Nokia Bell Labs, 2017, pp. 1-24.
Rappaport et al., "Overview of Millimeter Wave Communications for Fifth-Generation (5G) Wireless Networks-with a focus on Propagation Models", arXiv, Jul. 24, 2017, 15 pages.
Akyildiz et al., "Combating the Distance Problem in the Millimeter Wave and Terahertz Frequency Bands", arXiv, Feb. 13, 2019, pp. 1-8.
Office action received for corresponding Finnish Patent Application No. 20205846, dated Dec. 10, 2020, 9 pages.
Office action received for corresponding Finnish Patent Application No. 20205846, dated May 12, 2021, 7 pages.
Office action received for corresponding Finnish Patent Application No. 20205846, dated Sep. 7, 2021, 2 pages.
Office action received for corresponding Japanese Patent Application No. 2021-140852, dated Feb. 29, 2024, 2 pages of office action and 4 pages of office action translation available.
Office action received for corresponding European Patent Application No. 21191945.1, dated Aug. 28, 2024, 5 pages.

* cited by examiner

IDENTIFYING TRANSIENT BLOCKAGE

FIELD

The exemplary and non-limiting embodiments of the invention relate generally to wireless communication systems. Embodiments of the invention relate especially to apparatuses and methods in wireless communication networks.

BACKGROUND

Wireless communication systems are under constant development. Partly due to need for increased capacity, new techniques for communication systems are developed such as mounting radio access network, RAN, nodes at street level such as in lamp posts or sides of buildings. In many cases, to ensure good channel or signal quality, user equipment may need a line of sight to the RAN node or its antennas, especially if higher-band spectrum such as millimetre wave bands are used. User equipment moving in the streets may have line-of-sight to RAN nodes with good signal quality. However, when the line-of-sight is blocked, for example due to a moving truck obstructing the line-of-sight, the signal quality may rapidly decrease for the period of obstruction. In some cases, the obstruction and resultant signal degradation may be transient, lasting for a relatively short period of time, yet may cause a sharp reduction in the wireless link performance which can significantly impact the user experience. Knowledge of areas or cells where this kind of transient blockages occur at a relatively high rate is useful in network planning, for example, and to improve the user experience. In other cases, the user equipment may experience a transient loss of signal or beam even in an otherwise stable radio environment, such as without a direct obstruction, for example due to faulty implementation or improper placement of antennas at the device or the like. Identification of user equipment that experience this a higher likelihood of transient degradations is also useful to improving the user experience.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

Figure 1:
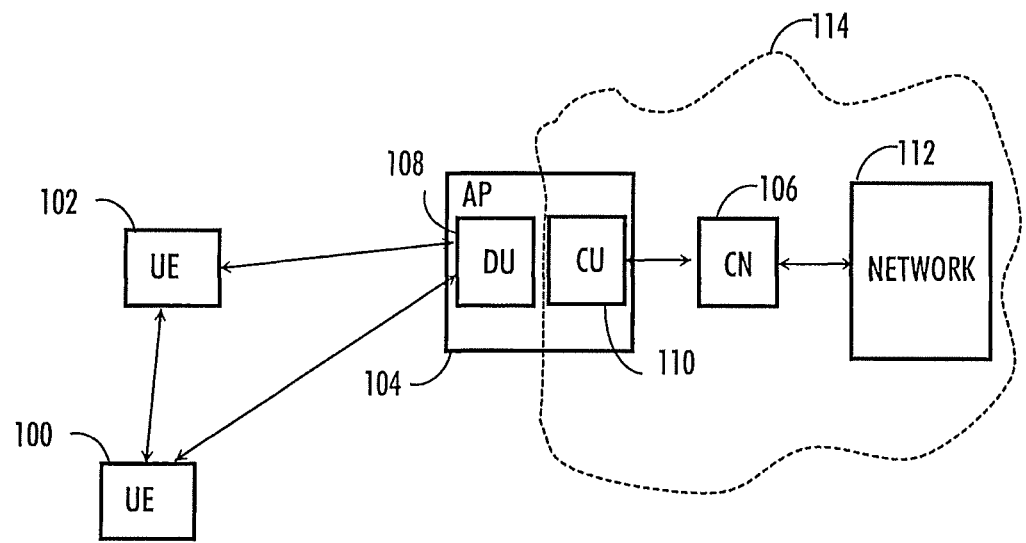

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node or a radio access network (RAN) node, such as (e/g)NodeB, serving devices in a cell. In one example, the node 104 may be a non-3GPP access node. The communication link where signals are sent from a device to a (e/g)NodeB is called uplink or reverse link and the communication link where signals are sent from the (e/g)NodeB to the device is called downlink or forward link. It should be appreciated that (e/g)NodeBs or their functionalities may be implemented by using any node, host, server or access point etc. entity suitable for such a usage.

A communications system typically includes more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may include a plurality of antennas or antenna elements. The (e/g)NodeB is further connected to the core network 106 (CN or next generation core NGC).

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (for example a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, for example to be used in smart power grids and connected vehicles. The device may also utilise a cloud service. In some applications, a device may include a user portable device with radio parts (such as a watch, earphones or eyeglasses) and the computation is carried out by a cloud service. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5 G enables using multiple input—multiple output (MIMO) antennas, many more base stations or nodes than the Long Term Evolution, LTE (a so-called small cell concept), including macro sites operating in co-operation with smaller stations and employing a variety of radio technologies depending on service needs, use cases and/or spectrum available. 5 G mobile communications supports a wide range of use cases and related applications including video streaming, augmented reality, different ways of data sharing and various forms of machine type applications (such as (massive) machine-type communications (mMTC), including vehicular safety, different sensors and real-time control. 5 G is expected to have multiple radio interfaces and/or to utilize diverse spectrum bands with widely differing propagation characteristics, for example below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5 G radio interface access comes from small cells by aggregation to the LTE. In other words, 5 G is planned to support both inter-RAT operability (such as LTE-5 G) and inter-RI operability (inter-radio interface operability, such as below 6 GHz-cmWave, 6 or above 24 GHz-cmWave and mmWave). One of the concepts considered to be used in 5 G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5 G require to bring the content close to the radio which leads to local break out and multi-access edge computing (MEC). 5 G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also include a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station including radio parts. It is also possible that node operations will be distributed among a plurality of servers, nodes or hosts. Application of cloudRAN architecture enables RAN real time functions being carried out at or close to a remote antenna site (in a distributed unit (DU) 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5 G (or new radio, NR) networks are being designed to support multiple hierarchies, where MEC servers can be placed between the core and the base station or nodeB (gNB). It should be appreciated that MEC can be applied in 4 G networks as well.

5 G may also utilize satellite communication to enhance or complement the coverage of 5 G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may include a plurality of (e/g)NodeBs, the device may have an access to a plurality of radio cells and the system may include also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, sometimes having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). An HNB Gateway (HNB-GW), which is typically installed within an operator's network may aggregate traffic from a large number of HNBs back to a core network.

Figure 2:
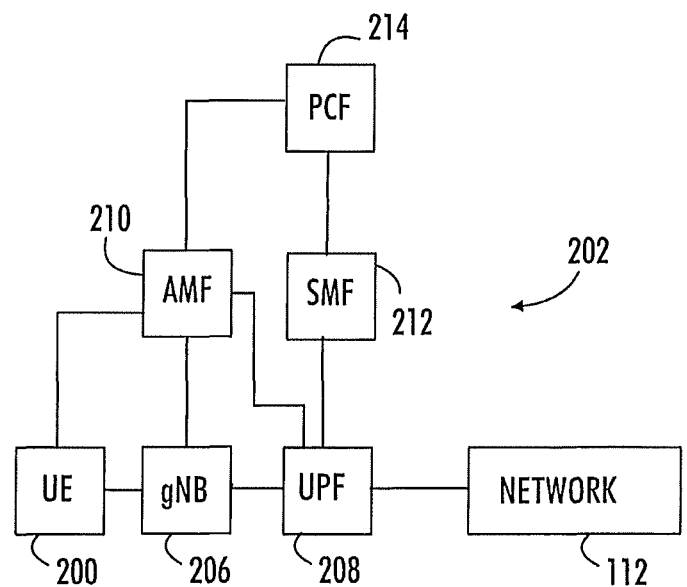

FIG. 2 illustrates an example of a communication system based on 5G network components. A user terminal or user equipment 100 communicating via a 5 G network 202 with a data network 112. The user terminal 100 is connected to a Radio Access Network RAN node, such as (e/g)NodeB 206 which provides the user terminal a connection to the network 112 via one or more User Plane Functions 208. The user terminal 100 is further connected to Core Access and Mobility Management Function, AMF 210, which is a control plane core connector for (radio) access network and can be seen from this perspective as the 5 G version of Mobility Management Entity, MME, in LTE. The 5 G network further includes Session Management Function, SMF 212, which is responsible for subscriber sessions, such as session establishment, modify and release, and a Policy Control Function 214 which is configured to govern network behavior by providing policy rules to control plane functions.

Figure 3A:
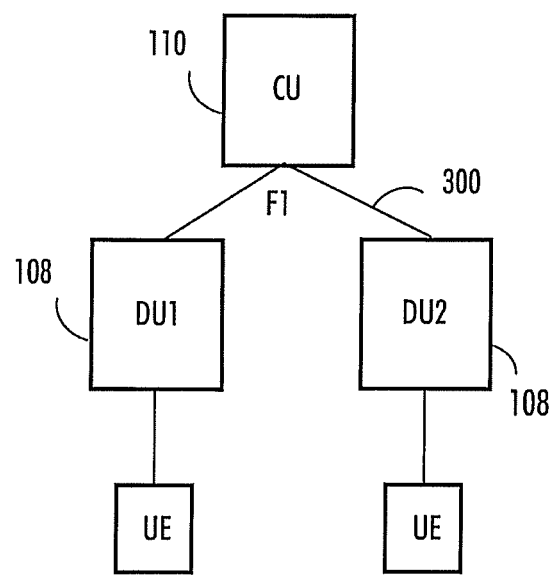
FIGS. 3A-3C illustrate examples of distributed and cloud radio access networks.
Figure 3B:
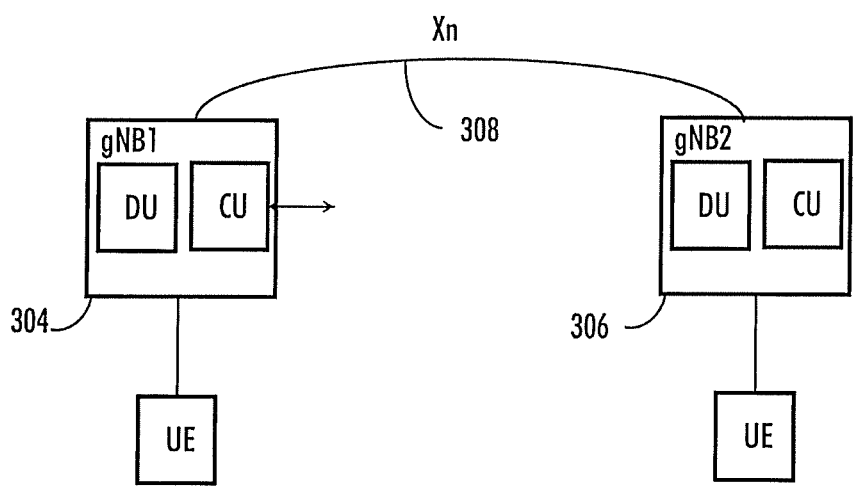
Figure 3C:
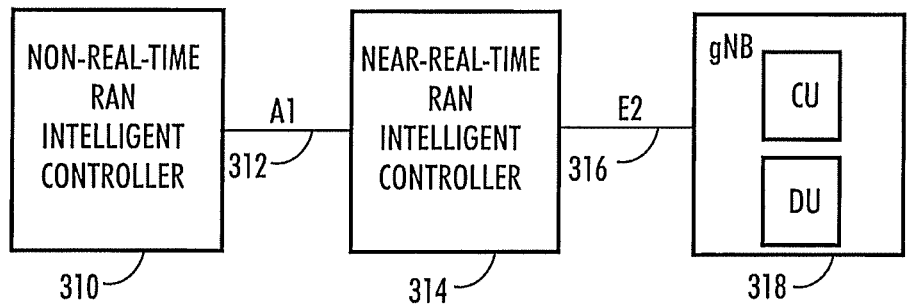

FIGS. 3A, 3B and 3C illustrate further examples of a 5 G based communication system. In an embodiment, RAN nodes or gNBs can be deployed in either distributed RAN (also known as D-RAN) or cloud RAN architecture (or C-RAN).

FIG. 3A illustrate an example of a cloud RAN architecture. In cloud RAN architecture, a gNB is decomposed into a CU (central unit) 110 and distributed unit (DU) 108. DUs communicate with the CU over F1 interface 300. Typically, a DU performs functions of Layer 2 and Layer 1, while a CU performs functions of Layer 3.

FIG. 3B illustrate an example of a distributed RAN architecture. The gNBs 304, 306 can be viewed as including both CU and DU functions. The gNBs 304, 306 can communicate with each other over Xn interface 308.

FIG. 3C illustrate a further example of a 5 G architecture. In this example, the architecture includes a non-real-time RAN intelligent controller, RIC-non-RT 310 and a near-real-time RAN intelligent controller, RIC-near-RT 312 which interact with the RAN node 318 via interfaces A1 312 and E2 314. In an embodiment, RIC-near-RT may also be integrated with the RAN node.

When 5 G networks are enveloped and planned new types of technologies are being introduced. Examples of these include dual/multi-connectivity, use of high band (mmWave) spectrum, massive multiple-Input-Multiple-Output (MIMO) and beamforming, for example. Due to this, it is likely that a significant number of problems are likely to crop up that can hamper the user experience of 5 G.

When a new network based on a new radio access technology such as 5 G is introduced, certain new UE implementations will not function properly or have anomalous behavior. Typical causes are immature chipset implementations due to the need to be early to market, limited UE support in terms number of antennas due to cost, early time to market pressures, problems with placement of new antenna types in the handset, use of simplified algorithms and less-performant circuitry to save costs, and limited support for standardized features due to cost, early time to market pressures. Further, technical complexity of 5 G radio technology in terms of flexible numerologies, various solution options such as frequent beam switching, one uplink versus multiple with LTE-5 G dual connectivity, analogue versus digital beam forming, Eigen based beamforming versus Grid of beams, battery consumptions versus frequent measurements for better radio link management, and the full ramifications of the different combinations and how they perform in various real life conditions in indoors, outdoors, with obstructions, in load conditions are all features that may be difficult to implement in the early phase of development of 5 G hardware.

Even when the network matures, some UE implementations may not function properly. As cheaper or lower-cost implementations become widely available, they will often have poorer quality.

Particularly in the case of 5 G mmWave, due to the use of a large number of antennas and high-band/large-bandwidth spectrum, there are significantly more dimensions to the RF environment, and consequently a greater need for high-quality sophisticated algorithms and circuitry at the UE to handle the needed new functionality such as analog beamforming, narrow beams, beam tracking, and the like. Correspondingly there is also a greater burden for testing and validation to assure correct behavior and performance.

With more immature UE implementations, the rush due to time-to-market pressures, and as cheaper/inferior UE chipsets becoming prevalent, it is very likely that there will be compromises on the sophistication of algorithms and circuitry in order to simplify implementation and save costs. This is likely to lead to poor behavior by the UE in several respects, causing a degradation of user experience and troubleshooting overhead for network operators.

The identified problems are likely to be more frequent in mmWave than on other radio bands and in other radio access technologies, they may still occur on these other bands and RATs.

The high band millimeter wave spectrum (above 6 GHz, for example 28 GHz or even higher) is taken into use in 5 G to provide high capacity in hotspots, such as urban centers or downtown areas, parks, and venues where large crowds can gather. Large amounts of bandwidth (such as 100 MHz to 1 GHz) may be available, making mmWaves attractive to provide high capacity.

Typically, RAN nodes utilising mmWave will be deployed with transceivers mounted at street level, such as on lamp posts or sides of buildings. High-tower installations are also possible but due to the limited propagation range of mmWave spectrum, it is useful to place the transceivers closer to the UE locations at lower height.

Due to the high frequency, the range of RAN nodes utilising mmWave spectrum is likely to be quite small, around 100-200 meters in the best case. The mmWave spectrum allows use of massive MIMO (multiple-input-multiple-output) antenna arrays with a large number of antennas, allowing the ability to form narrow beams to focus the transmitted energy. This allows overcoming the propagation loss to some extent. Due to the limited range, network operators will likely have to deploy a large number of mmWave nodes to provide adequate coverage.

Due to the limited range of a mmWave node, it is likely that key reason for connection failures or problems in mmWave cells will be a sustained loss of coverage for example when the UE moves out of the reach of the downlink beams, or out of range of uplink reception. In such cases, the loss of signal is not a transient degradation, rather the loss of signal is a more or less permanent loss until the UE returns to the range of coverage of the cell.

Electromagnetic Propagation in mmWave spectrum has very poor ability to penetrate through materials. Thus, a variety of materials can block a transmitted signal, leading to a near-complete loss of signal. Therefore, the strongest beam of UE for a given cell will typically be a direct line of sight path, in the absence of any blockage. However, when an obstacle blocks the path, the strongest beam may be badly degraded.

MmWave spectrum can also reflect off surfaces such as glass/buildings. This can give rise to potential alternative line of sight paths, that may allow beam transmission potentially around obstacles in a non-line-of-sight manner.

In street-level cells, the UE's line of sight to the RAN node can be obstructed by moving obstacles. Since the obstacles can move, the obstruction can last for short periods of time, for example 1-5 seconds.

For example, the UE may be standing still but trucks or buses or other vehicular traffic may be moving past the UE—this can block the UE's transmission for a few seconds, but then clear.

In another example, the UE may be pedestrian and walking, and moves behind a stationary obstacle such as bus-stop or street-side stall/vendor or advertisement blocking the UE's strongest beam.

When an obstruction of this type happens, the UE's strongest beam will suddenly experience a sharp degradation in spectral efficiency. This can have various significant effects on the connection between the UE and the RAN node. For example, downlink transmissions on Physical Downlink Shared Channel (PDSCH) may encounter a series of decoding failures, leading to Hybrid automatic repeat request (HARQ) negative acknowledgements (NACKs) if the uplink is still functioning. In the worst case, Physical Uplink Control Channel (PUCCH) transmissions of the UE carrying the HARQ ACK/NACK may also fail due to the obstruction, leading to PUCCH decoding failures (or discontinuous transmission, DTX).

The UE may be able to report a sharp drop in the channel quality via Channel State Information (CSI) reporting on PUCCH. However, in the worst case the PUCCH transmissions may also fail due to blockage, and thus the RAN node may not be able to receive any of the channel quality updates.

The RAN node may be configured to reduce modulation and coding scheme (MCS) of the UE rapidly to counteract channel degradation. If the degradation is severe, the RAN node may even have to drop to MCS0. In the worst case, the UE may be unable to decode Physical Downlink Control Channel (PDCCH) or send Radio Link Control (RLC) status packets, possibly leading to radio link failure on the mmWave link.

This situation may persist for a short stretch of time (for example a few seconds) until the obstacle clears. During this time transmissions to/from the UE on the mmWave link may be stalled completely. Thus, while the UE may be well within the coverage range of a RAN node, the transient occurrence of such an obstacle may significantly disrupt the traffic for the UE.

In the obstructed situation the downlink throughput of the UE will suddenly drop. For example, with clear line of sight the throughput may be much greater than 1 Gb/s, but when the obstacle appears, it may drop to much less than 100 Mbps (or in the worst case, 0 throughput on the mmWave link though the UE may still be able to do a few Mb/s on a low-band link if available). Typically, Transmission Control Protocol (TCP) used in Internet connections is not robust to large changes in link performance like this, and TCP throughput may even stall completely.

When the obstacle clears, the link-level performance on the link will very quickly improve again. However, even if the link quality itself has improved, due to TCP recovery algorithms after a stall, it may take another few seconds before the UE's end-to-end throughput recovers back to the full throughput that the link can deliver, thus from an end-to-end perspective the UE's throughput and user experience may suffer for a longer time.

It is possible that in some cases the physical environment may have reflected paths that may allow a UE to latch on to a secondary beam of reduced signal strength (and reduced spectral efficiency) if its primary beam experiences a transient blockage. Even if this is the case, it will still take time to scan for alternative beams and identify a sufficiently strong one and being able to perform random access or other beam recovery procedure to switch to an alternative beam. During this time, transmissions to the UE will be severely degraded, and the secondary beam may be anyway much weaker than the first beam so even after the UE has latched on to the secondary beam, its connection quality may be poor.

In some cases the UE may have also available a connection to a low-band-spectrum cell (such as an umbrella cell maintained by a macro RAN node, for example) with much better propagation characteristics, for example if the UE is doing dual connectivity or carrier aggregation between the mmWave cell and the low-band cell. This low-band link may still be functional and allow the UE some connectivity but will typically provide much lower throughput than the mmWave link can provide.

The above problem is especially prominent in mmWave bands. However, similar problem may also occur on other bands. Below, mmWave bands is discussed but similar issues apply to other bands as well as one skilled in the art is well aware.

Some cells may be more prone to the above described feature of transient obstacles than others. Transient obstacles can result in very unpredictable user experience, compared to other mmWave cells in which this kind of transient obstruction is not frequent. For example, if mmWave is deployed in an outdoor arena or park where pretty much every user may have line of sight to the mmWave antenna, such transient obstacles may not be present, and UEs may obtain consistently high throughput uninterrupted Since operators will deploy a large number of mmWave cells, it is not manually possible to identify cells where the UE experience is inconsistent and unpredictable due to such transient obstacles. Therefore, it is useful to be able to automatically identify cells that have a higher likelihood of transient blockages or degradations, so that appropriate actions may be invoked (either automatically or by operator intervention) to improve the user experience in these cells.

It may be noted that the sharp degradation of signal quality from transient blockages obstructing the mmWave link is quite different from a UE's connection to an mmWave cell dropping due to loss of coverage at the edge of a mmWave cell coverage.

All mmWave cells (and cells utilising other frequency bands as well) will typically show significant connection losses whenever UEs move out of the coverage range of a cell. A mmWave cell has quite limited coverage, and a UE may reach edge of coverage suddenly, and lead to dropped mmWave connections. Some typical examples of how events that might lead to ending a UE's connection to an mmWave cell at the edge of the cell are as follows:

At a certain distance from the cell, the downlink signal received at the UE may still be strong due to high transmit power and beamforming gain, while the uplink signal received at the RAN node degrades significantly as the UE reaches its power limit and unable to sustain, Physical Uplink Shared Channel (PUSCH) or PUCCH transmission. Once the UE continues moving away past this distance, it is not possible to sustain a downlink+uplink connection to the RAN node. The distance at which this occurs may be dependent on the cell's environment and propagation characteristics, and also on the vendor algorithm implementation in the RAN node.

5 G specifications of 3rd Generation Partnership Project (3GPP) provide high degree of liberty for vendor implementations in RAN nodes for supporting different features, such as various reference signals and their transmission types and intervals, single user/multiuser MIMO, in beamforming and scheduling algorithms for requesting and using UE feedback, for example different reporting interval, reporting type and level of detail of the feedback, for sending retransmissions and repetitions, data duplication, etc. The RAN node algorithm implementations may involuntarily support differently varying conditions in urban and other areas.

3GPP 5 G specifications also allow many possibilities for UE vendors for implementing the standardized functionality such of what functionality and aspects to support, algorithm details, for example.

Thus, typically at the edge of a cell, it is quite normal to see a certain number of dropped or terminated mmWave connections, when the UE reaches the edge of the mmWave cell coverage. This is typical behavior for at the cell edge of mmWave cells, and operators typically maintain statistics tracking dropped connections. Operators typically also maintain Key Performance Indicators (KPIs) such as average cell and user throughput and MCS distribution within a cell. However, the sudden sharp degradations due to the occurrence of transient blockages even when the UE is well within the coverage range of a mmWave cell is a qualitatively different phenomenon that is not tracked by conventional statistics on dropped connections or throughput/MCS-type KPIs that operators typically monitor. The user experience degradation due to such transient blockage in 5 G mmWave cells is a concerning phenomenon for operators. However, there is no easy way to identify the mmWave cells where this is happening excessively from the typical KPIs and statistics that operators monitor in a conventional network, and this is exacerbated by the fact that the 5 G network may have a large number of mmWave cells.

A similar problem is related to UEs. Many UE implementations may encounter problems in maintaining a stable and high-performance connectivity to a high-capacity 5 G mmWave cells even when the UE is within coverage range of the cell. New UE implementations may demonstrate poor performing behavior for a variety of reasons, such as immature chipset implementations due to the need to be early to market, problems with placement of new antenna types and with limitations to the number of antennas supported in the handset (for example), use of simplified algorithms and less-performant circuitry to save costs, suboptimal feature combination use due to 5 G's flexible numerologies, due to big number of new functionality, due to differences in 5 G vendors' RAN node implementations and less rigorous testing and validation performed to the UEs.

In some cases poor performance may be experienced by individual UEs, while in some cases they may affect a class of UEs, such as all UEs with a certain chipset/firmware, with a certain make and model, with certain feature combination support, for example, depending on how quickly the UE and/or the network can recover from the degradation.

One of the likely consequences of the above is that a UE may show sharp transient degradations in performance, even when UE's radio frequency conditions in the mmWave cell are stable. For example, in the middle of a download over a strong/direct line of sight beam, a UE may show a sudden loss of throughput for a short amount of time (for example 100s of ms to a few seconds), followed by a recovery to full throughput. Even if at the link level the degradation lasts only for a short time, at an end-to-end level, this kind of high variability may be enough to cause TCP throughput to stall, and even after the link level performance has been regained, the end-to-end TCP throughput may take longer to recover.

These sharp transient degradation problems may escalate to lost radio connections requiring beam recovery or even RRC connection re-establishment, change of cell, for example.

Regarding above mentioned situations where there are reflected paths that may allow a UE to latch on to a secondary beam of reduced signal strength, if the channel estimation and beam tracking algorithms of the UE are noisy, due to poor or immature UE implementation for example, this may cause the UE to spuriously and momentarily sense that a different beam has become better than its direct beam. This will cause the UE to report to the RAN node that its beam has switched, and to try to connect via the new beam. Since reflected beams may be unstable, when attempting to switch, the UE may then realize that this alternative beam is in fact no longer strong, and then the UE may try to revert back to the primary beam. In the meantime, the UE would experience a sudden loss of throughput, followed by recovery once the primary beam is acquired again.

In addition, due to instability in beam tracking algorithms in a poorly implemented UE, while a pedestrian UE moves, it may detect that its current beam has become weak, but it may have difficulty in rapidly identifying which alternative beam is a strong beam at its new position. In spending too much time hunting for a new beam, the UE may experience a sudden drop in throughput, followed by a resumption of good throughput when the UE eventually manages to find a new beam.

Further, as the mmWave propagation is sensitive to blockages, even very rapid occlusions (such as a bird flying past the UE) may disrupt the beam. A poorly implemented UE may immediately spuriously detect a beam failure and/or hunt for a new beam, leading to a much longer degradation in the user experience than the actual occlusion. Eventually the UE may detect that its original beam is again its strongest beam. Depending on how robust the algorithms are at the UE, the UE may be able to overcome such occlusions resume transmissions on its beam more rapidly Further, due to noisy beam-signal strength measurement algorithms at the UE, a UE may spuriously measure that some other beam has become sufficiently strong even if its primary direct beam is also still strong. This may cause the RAN node to attempt to use the other beam (for example in order to load-balance across beams, or to maximize spectral efficiency by multiplexing that UE's transmissions with other UEs on the other beam in frequency domain, etc). This may cause the UE performance to drop unintentionally, even if the primary beam is still strong.

From a user's perspective, the above described experience of sharp transient degradations will be interpreted by the user as poor performance of the 5 G network. Further, some user equipment may exhibit a greater tendency or likelihood of sharp transient degradation problems in not just one cell but in multiple cells, leading to those users getting a poor user experience in a more widespread manner. While network operators may believe that this problem of sharp transient degradation is due to immature or inadequate UE implementation, it is very difficult to pinpoint that this is the case, or to identify the underlying beam degradation at the UE that is causing this. Further, since 5 G is expected to have a high number of UEs, and mmWave cells are expected to be deployed in large numbers/high density in order to provide enough coverage, being able to diagnose such problems can be very complex for network operators. Hence there is a need to be able to automatically identify UEs which have a higher likelihood of experiencing transient degradations.

Therefore, there is a need to identify both cells and UEs which are prone to experience the above described experience of sharp transient degradations, so that some actions to remedy the problem may be taken.

Figure 4A:
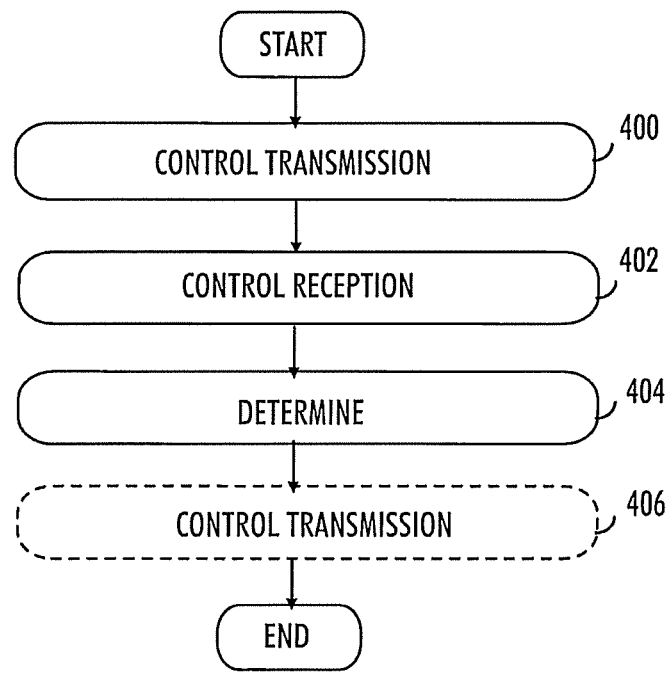
FIGS. 4A, 4B and 4C are flowcharts illustrating some embodiments.

The flowchart of FIG. 4A illustrates an embodiment. The flowchart illustrates an example of the operation of an apparatus in a communication system for identifying transient blockages. In an embodiment, the apparatus may be located in a RIC-near RT or in a CU of a RAN node.

In step 400, the apparatus is configured to control transmission to one or more Radio Access Network RAN nodes of parameters for the one or more RAN node to detect occurrences of sharp channel degradation events in connections served by the node and/or in cells served by the RAN node. In case the apparatus is located in CU, the transmission is directed to DUs controlled by the CU.

In step 402, the apparatus is configured to control reception from the one or more RAN nodes of data related to channel or transmission events related to detected sharp channel degradation in connections served by the node and/or in cells served by the RAN node. In case the apparatus is located in CU, the data is received from the DUs controlled by the CU.

In an embodiment, the apparatus may receive the values for the above parameters from network. In an embodiment, the values for the parameters may be set by the operator of the network. In an embodiment, the apparatus may adapt the values for the parameters dynamically. For example, the operator of the network may start the system by configuring relatively low initial values, and as more data is gathered and typical scales are observed in the network, the values can be slowly increased by the apparatus to reduce noise or variability in the measurements reports.

In step 404, the apparatus is configured to determine, based on the received data, likelihood that one or more RAN nodes and/or one or more cells served by the one or more RAN nodes have a high level of transient blockages.

In an optional step 406, the apparatus may be configured to transmit to a network element, such as a network management entity, data on or an indication of determined one or more RAN nodes or cells served by the RAN nodes having a high level of transient blockage.

In an embodiment, the data or the indication triggers the network element to invoke corrective action or countermeasures to improve the user experience in those cells and/or RAN nodes. These corrective actions may include automated or manually-guided replanning or optimization of the parameters or location of the RAN nodes or cells, adaptation of radio resource management parameters—such as using wider beams or using lower rank MIMO transmissions, using more robust modulation and coding schemes for downlink/uplink transmissions, using additional pilot signals such as demodulation reference signals (DMRS) to enable better channel estimation, using additional or more frequent pilot or reference signals for better beam tracking, enabling specific additional features or algorithms, and the like.

Figure 4B:
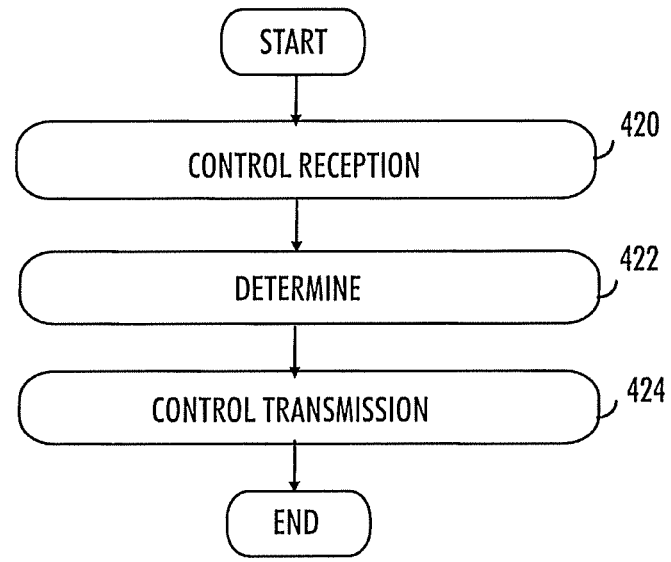

The flowchart of FIG. 4B illustrates an embodiment. The flowchart illustrates another example of the operation of an apparatus in a communication system for identifying transient blockages.

In step 420, the apparatus is configured to control reception from the network, of data on user equipment served by one of the one or more RAN nodes.

In step 422, the apparatus is configured to determine, based on the data received from the network in step 420 and/or the one or more RAN nodes in step 402, likelihood that user equipment have a high level of transient degradation.

In step 424, the apparatus is configured to transmit to a network element such as a network management entity, for example, data on or an indication of determined user equipment having likelihood for high level of transient blockage.

In an embodiment, the data or the indication triggers the network element to invoke corrective action or countermeasures to improve the user experience or reduce the impact to the determined user equipment. The corrective actions may include subscriber profile or QoS profile modifications for the user, providing additional user-specific policies to the RAN nodes to adjust the radio resource management parameters for example to make the transmissions to the user equipment more robust (such as using wider beams or using lower rank MIMO transmissions, using more robust modulation and coding schemes for downlink/uplink transmissions, using additional pilot signals such as demodulation reference signals (DMRS) to enable better channel estimation, using additional or more frequent pilot or reference signals for better beam tracking), providing notifications to the user of detected poor performance being related to the poor behavior of the user equipment, providing offers to the user to upgrade the user equipment or modifications to the service or billing plans, and the like.

Figure 4C:
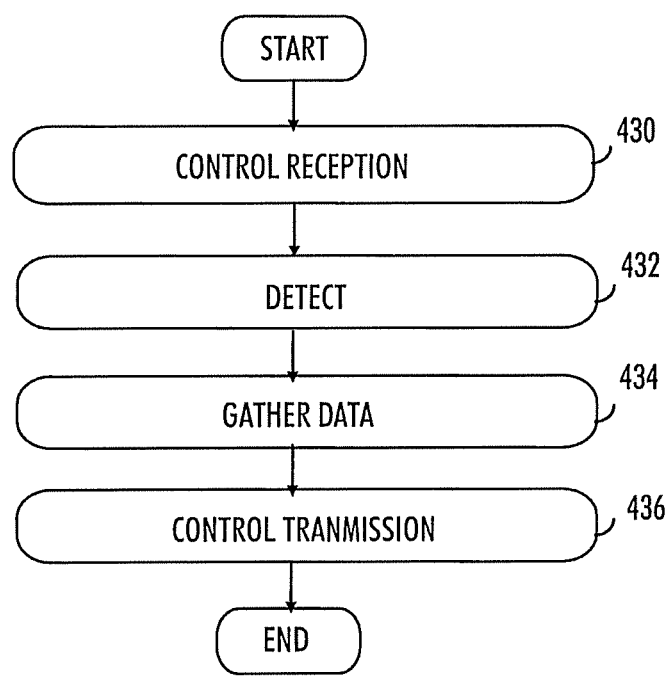

The flowchart of FIG. 4C illustrates an embodiment. The flowchart illustrates an example of the operation of an apparatus in a communication system for identifying transient blockages. In an embodiment, the apparatus is a RAN node or DU of a RAN node.

In step 430, the apparatus is configured to control reception of parameters for the apparatus to detect occurrences of sharp channel degradation events in connections served by the apparatus and/or in cells served by the apparatus.

In step 432, the apparatus is configured to detect one or more sharp channel degradation events.

In step 434, the apparatus is configured to gather data related to the one or more events.

In step 436, the apparatus is configured to control transmission of data related to channel or transmission events related to detected sharp channel degradation in connections served by the apparatus.

Thus, an apparatus for identifying cells with a likelihood of experiencing transient blockages is proposed. Further, in an embodiment the apparatus is capable of identifying UE having a risk for transient blockages or degradations. The apparatus may be denoted as Module for Identifying MmWave Cells/UEs with Transient Blockage/Degradation (MIMCTB).

In an embodiment, the apparatus may distinguish symptoms of transient blockage in a cell, in contrast to scenarios where a UE has "normally" moved out of the coverage of a cell. The former has a characteristic signature of a sharp degradation in an otherwise good signal, which persists for a certain amount of time with a good likelihood of recovering to a good level again, while the latter typically results when a UE has irretrievably moved out of the downlink or uplink signal range of a mmWave RAN node. By extracting the appropriate information from each RAN node serving a mmWave cell relating to certain event statistics or measurements, the apparatus may identify which cells in the network have a relatively high occurrence of transient blockage that disrupts the user experience even within the coverage range of a cell.

The proposed method identifies some key information elements that can be used for identifying cells with a high level of or high likelihood of transient blockage, and an automatic method of identifying the cells which are affected by this to a high extent or to a greater extent than other cells in the network.

Further, by extracting the appropriate information for each user from each mmWave cell relating to metrics or measurements related to certain types of degradation events which are key indicators of beam degradation, the apparatus may identify which UEs have a relatively higher than normal occurrence of transient beam degradation that can disrupt the user experience even when the user is within the coverage range of a cell. The proposed method identifies some key information elements that are key to identifying UEs with a high level of transient beam degradation.

In an embodiment, the apparatus may determine that UEs that have anomalously poor behavior in terms of transient beam degradation are more likely to show this behavior more frequently across multiple cells, rather than just in one or a few cells. In an embodiment, the proposed solution uses UE identifiers in conjunction with the detected transient beam degradation events, in order to determine the level of transient beam degradation experienced by a UE across multiple connections and/or in multiple cells, and using this, to determine which UEs have a higher than normal occurrence of such transient beam degradation across multiple cells across multiple connections.

In addition, the transient blockage may have further consequences to UE MCS, MIMO rank value and other reporting to the RAN node resulting in suboptimal air interface capacity use and end user experience.

The communication network has access to the "persistent" identity of a UE, and possibly other information such as the identifier of a class to which the belongs. By accessing this information on the UE's identifier or class identifier, it is possible to associate beam degradation events for the same UE across multiple cells. The proposed method uses this to identify UEs that have an anomalously high level of transient beam degradations.

Radio Access Network may also use additional information which may be impacting the situation to varying degree. UE related information may include UE capabilities and UE user connection details on functionality used especially over the air interface on layer 1 to layer 3. UE location cell related information may include frequency band, FDD/TDD mode, indoor/outdoor, etc.

Figure 5:
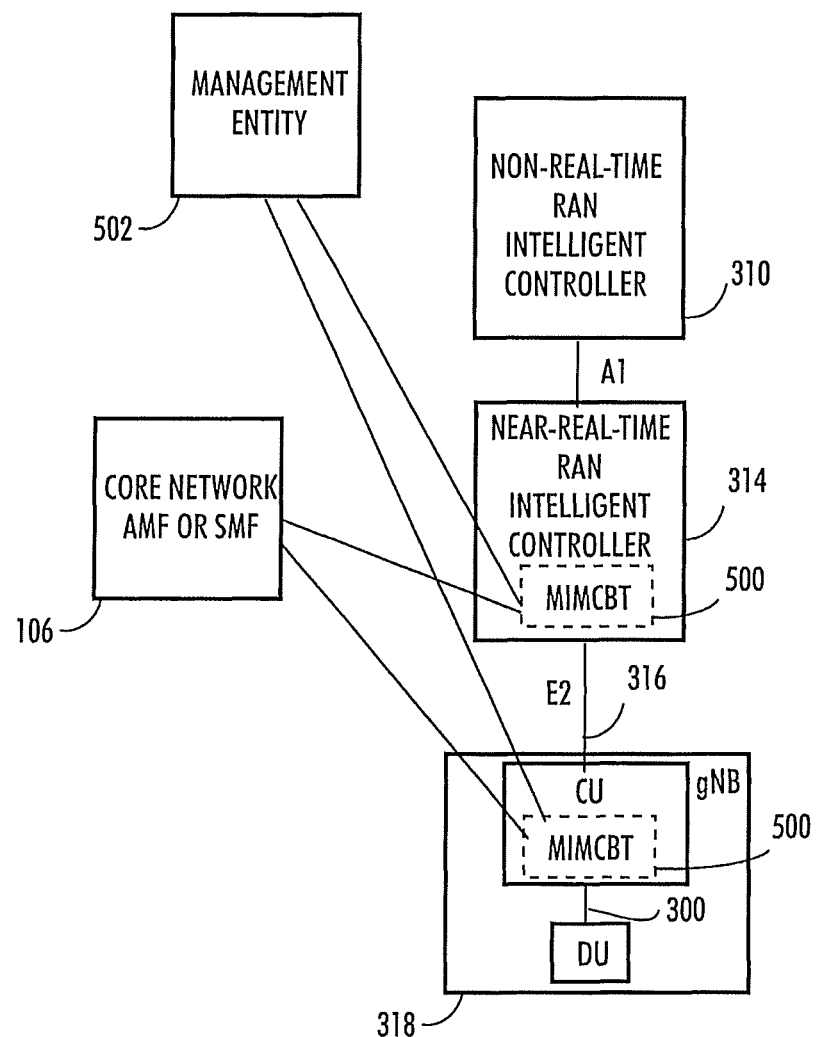
FIG. 5 illustrates an embodiment.

FIG. 5 illustrates an example. As mentioned, in an embodiment, the MIMCTB 500 is located at a near-real-time intelligent controller, RIC-near-RT 314, interfacing to a RAN node. Communication between them is via E2 interface 314.

In an embodiment, the MIMCTB 500 is located at CU in a Cloud-RAN architecture, and interfaces to a DU via F1 interface 300.

In an embodiment, the MIMCTB 500 may be connected to a network server or management entity 502 and to core network 106, either AMF or SMF.

Figure 6:
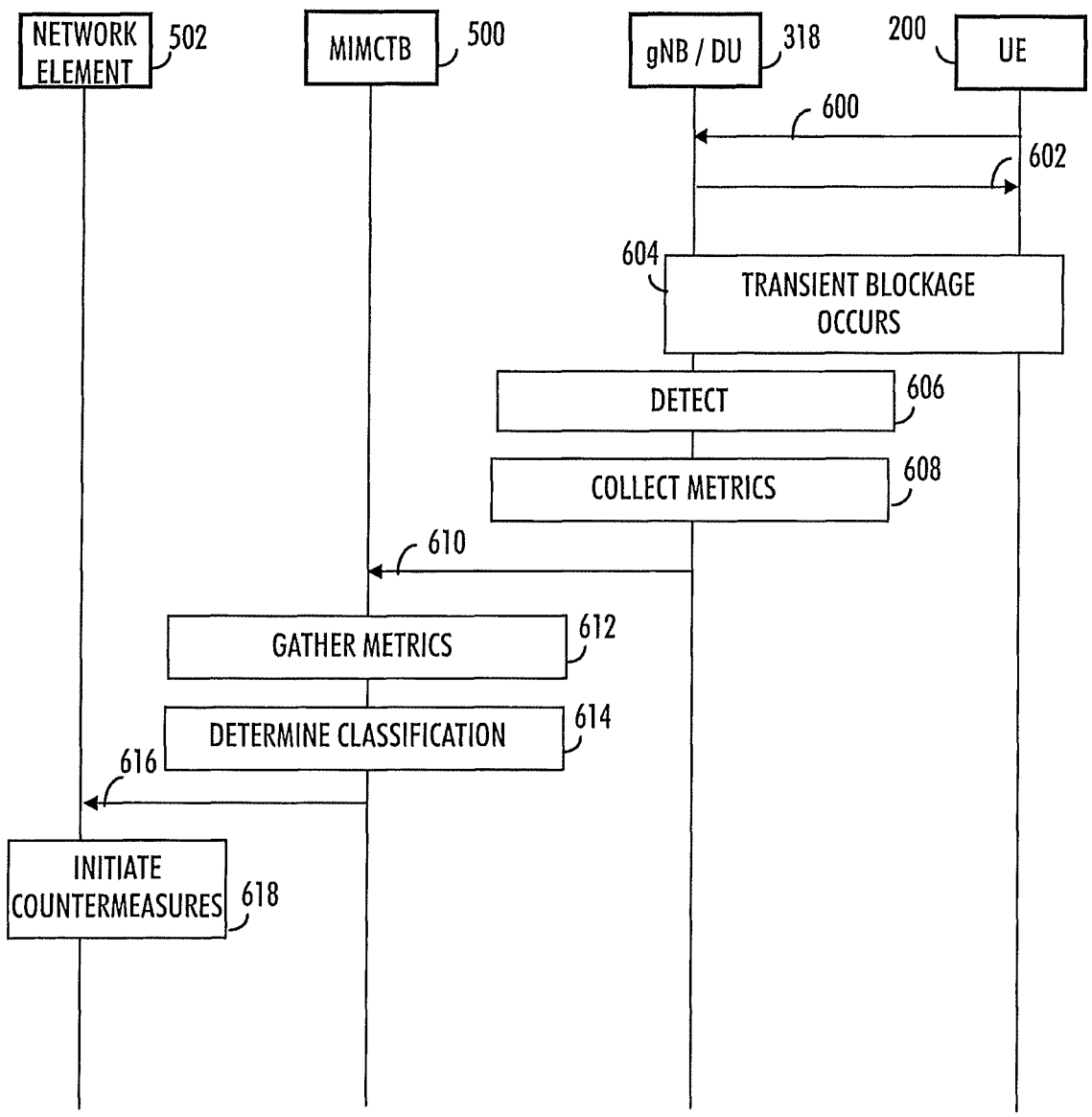
FIG. 6 is a signalling chart illustrating an embodiment.

FIG. 6 is a signalling chart illustrating an embodiment.

A RAN node (or DU of the RAN node) and UE have established RRC connection 600. There is an ongoing data transfer 602 with good channel quality. Next, a transient blockage occurs 604: channel quality degrades rapidly.

The RAN node (or DU of the RAN node) detects 606 a sharp degradation in channel or some transmission failures. The RAN node is configured to collect 608 key metrics related to the sharp channel degradation. In an embodiment, the RAN node has received earlier the metrics from the MIMCTB. The RAN node transmits 610 a report of the occurrence sharp channel degradation and related metrics. In an embodiment, the report includes RAN-level identification of the UE in question.

The MIMCTB 500 is configured to gather metrics 612 of multiple sharp channel degradation events. In an embodiment, metrics are gathered from multiple RAN nodes.

The MIMCTB 500 is further configured to, regarding one or more RAN nodes, determine 614 classification or likelihood of high occurrence of transient blockage.

In an embodiment, the MIMCTB 500 is further configured to notify 616 a network server 502 of the determination of high likelihood of transient blockage in one or more cells served by the one or more RAN nodes.

In an embodiment, the network server 502 is configured to initiate counter measures 618 for cells with likelihood of transient blockage.

As mentioned above in connection with step 400 of FIG. 4, the MIMCTB may provide one or more RAN nodes (or DUs) with parameters that enable the RAN node(s) to detect the occurrence of a sharp channel degradation event. In an embodiment, the parameters related to detecting the occurrence of sharp channel degradation event include one or more of the following.

A time duration T of a window over which certain metrics such as counts and averages (as indicated below) will be calculated by the RAN node. T may have different values, or example T=0.1 seconds or 0.5 seconds. A sliding window may be used, but alternatively exponential averages with a time-constant T can be used as well.

A minimum number N1 of steps by which modulation and coding scheme (MCS) should be reduced within the time duration T. Alternatively, a minimum difference between the maximum MCS and minimum MCS within the time duration, where the minimum MCS occurs subsequent in time to the maximum MCS.

A minimum length N2 of a sequence of consecutive run of discontinuous transmissions (DTXs) (i.e. a series of successive DTXs) of PUCCH/PUSCH transmissions (such as PUCCH for CSI reporting, or PUCCH for ACK/NACK reporting). A DTX is an event where a RAN node was expecting the UE to transmit a PUCCH or PUSCH transmission based on scheduling but failed to decode anything successfully. The implication is that either the UE transmitted but the uplink channel is degraded leading to decoding failure (indication of uplink channel degradation), or the UE did not even decode the original downlink PDCCH/PDSCH transmission and therefore did not even transmit on uplink (indication of downlink channel degradation).

A minimum length N3 of a sequence of consecutive of HARQ negative feedbacks.

A minimum fraction F1 of HARQ negative feedbacks to total number of HARQ feedbacks within the time duration T.

A minimum fraction F2 of uplink discontinuous transmissions in uplink control channel to total number of transmissions within the time duration T.

A minimum modulation and coding scheme of user terminal before occurrence of sharp channel degradation.

A minimum signal level for user equipment before occurrence of sharp channel degradation.

A maximum duration T1 of time between events E1-1 and E1-2, where:
  E1-0: a UE reports a first beam as its strongest beam
  E1-1: the same UE reports a second beam as its strongest beam where the second beam is not a neighboring beam of the first beam, with the signal level of the second beam being significantly less than the first beam.
  E1-2: the same UE reports a third beam as its strongest beam where the third beam is a neighboring beam of the first beam, with the signal level of the third beam being significantly better than the signal level of the second beam (the third beam could be the same as the first beam).

A maximum duration of time T2 between events E1 and E2, where:
  E0: a UE reports a first beam as its strongest beam
  E1: the same UE reports a second beam as its strongest beam where the second beam is not a neighboring beam of the first beam, with the signal level of the second beam being significantly less than the first beam
  E2: the same UE reports a third beam as its strongest beam where the third beam is a neighboring beam of the first beam, with the signal level of the third beam being significantly better than the signal level of the second beam A maximum time T3 between events E3-1 and E3-2, where:
  E3-0: a UE reports a first beam as its strongest beam.
  E3-1: the same UE reports a beam failure on the first beam, and may indicate a different beam as strongest beam.
  E3-2: the same UE the first beam is again the strongest beam.

It is possible that for each of the parameters above, multiple values are provided by MIMCTB to the RAN nodes. In this case, RAN nodes will report occurrences of events as determined for each different value of the parameter.

As mentioned in step 402 above, the MIMCTB receives from the one or more RAN nodes (or a DUs) data related to channel or transmission events related to detected sharp channel degradation in connections served by the node. The data may be metrics related to detected sharp channel degradation events on the mmWave link for one or more users in one or more cells.

In an embodiment, the metrics may include one or more of the following.

A list L1 of entries, each corresponding to an occurrence where a modulation and coding scheme of user terminal was reduced by more than N1 steps within the time duration T. In an embodiment, each entry may correspond to an occurrence where a UE's MCS (on PDSCH and/or PUSCH) was reduced by more than N1 steps within the time window of duration T.

A list L2 of entries, each corresponding to an occurrence where for a user equipment, there was a sequence of consecutive discontinuous transmissions of length at least N2. In an embodiment, each entry may correspond to an occurrence where for a UE, there was a run of DTX of PUCCH/PUSCH (of CSI or ACK/NACK reports) of length at least N2. In case both long PUCCH and short PUCCH are used, this may be reported separately for short PUCCH and long PUCCH.

A list L3 of entries, each corresponding to an occurrence where for a user equipment, there was a sequence of consecutive of HARQ negative feedbacks of length at least N3.

A list L4 of entries, each corresponding to an occurrence where for a UE, beam switch events E1 and E2 happened within a time T2, where E1, E2 as defined above.

In an embodiment, the metrics may include one or more of the following.

A list of entries L11, each corresponding to an occurrence where for a UE, events E1-1 and E1-2 happened within a time T1 (where E1-1, E1-2 defined above)

A list of entries L12, each corresponding to an occurrence where for a UE, events E2-1 and E2-2 happened within a time T1 (where E2-1, E2-2 defined above)

A list of entries L13, each corresponding to an occurrence where for a UE, events E3-1 and E3-2 happened within a time T1 (where E3-1, E3-2 defined above).

In an embodiment, for each entry in each of the lists above, the RAN node may additionally provide:
  Last L1 signal level(s) prior to the corresponding occurrence.
  Last MCS and/or Channel Quality Indicator (CQI) prior to the occurrence (this could be one MCS/CQI value, or a list with the last N values, to provide a time-trace of the channel prior to the occurrence).
  For entries in Lists L11/L21/L31: Initial beam identification (ID) (corresponding to E1-0/E2-0/E3-0 respectively for entries in lists L11/L21/L31 respectively).
  For entries in Lists L11/L12: Switched beam ID (corresponding to E1-1/E2-1)
  An indication whether the connection was dropped after the occurrence.
  A RAN-level UE identifier (such as a Cell Radio Network Temporary Identifier C-RNTI or N2AP UE ID or S1AP UE ID) for the associated UE, and optionally related UE capabilities (for example on various related functionality), RRC configurations (for example on CSI reporting).

Cell information, for example cell identity such as Cell Global Identity (GCI) or a Physical Cell Id (PCI).

Synchronization Signal Block (SSB) beam information, for example identity

Channel State Information Reference Signal (CSI-RS) information

Channel State Information/Downlink Control Information/Uplink Control Information (CSI/DCI/UCI).

In an embodiment, the above metrics may be reported by the RAN node to the MIMCTB periodically, for example at 5 minute or 15 minute intervals, or any suitable time scale. In an embodiment, faster reporting may be used to get more granular information.

In case there are multiple cells at the RAN node, the information may be provided for each cell. Counts across users can be aggregated, and/or reported on a per-user basis.

When a RAN node sends the metric information to the MIMCTB, it can report the occurrences of each type as observed since the last time the metric information was reported. In addition, it may report the time elapsed since the last message or add a timestamp to the message.

In an embodiment, instead of reporting lists of occurrences with additional information (such as last signal level or MCS etc) for each occurrence, the RAN nide may instead report just the accumulated counts of each type of occurrence since the last report. This can reduce the volume of information provided but loses some granularity that could help with better decision-making.

In an embodiment, within each reporting interval, there may be multiple windows of duration T1 over which counts like M1 are calculated. In this case, the metrics M1, M2, . . . can be reported for each window where applicable.

In addition, the RAN node can send to the MIMCTB (or the MIMCTB can acquire from another entity such as a trace collection entity) information such as UE-reported Minimization of Drive Test (MDT) measurements including beam failure reports, which also it can use.

As mentioned in step 404 above, the MIMCTB may be configured, based on the received information, to determine a classification or a likelihood that one or more of the RAN node(s) have a high level of transient blockage.

An example of determination is provided below. In an embodiment, machine learning algorithm for the MIMCTB may be utilised to perform the determination. Below it is assumed that the received information is provided in the form of lists as described above, rather than just accumulated counts.

In an embodiment, for determining which cells have high likelihood of have a high level of transient blockages, MIMCTB can do the following For each cell reported:
  For each event in each list reported:
    Form an event signature, consisting of the sequence of channel conditions leading up to the event, during the event, and subsequent to the event. Mark or tag the event as a sharp degradation, depending on whether the channel conditions prior to the event were sufficiently good or not, and depending on the magnitude of degradation as well as the duration of the degradation. For example, event may be marked as a sharp degradation if the last MCS prior to the occurrence was at least a minimum value M, and the last signal strength or L1-RSRP was at least a minimum value S. If channel conditions were not sufficiently good, then it may indicate that the UE was already relatively close to the cell edge, and hence not suitable for identifying transient blockage. Further, an event may be marked as a sharp degradation event if the magnitude of the decrease in MCS or L1-RSRP was at least some minimum value, and/or if the duration of the degradation event (i.e. amount of time elapsed from the start of the degradation till the signal recovered to a good level similar to the level before the degradation) is below a certain value.

Mark a 'sharp degradation' event as a transient blockage if the event was not followed by a connection loss Let (r1, r2, r3, r4) be the counts of events that were marked as transient blockages in the lists (L1, L2, L3, L4) respectively, divided by the time between the messages and the number of users connected to the cell. This can be viewed as a "rate of transient blockages per unit time per user", or a representation of the likelihood or level of transient blockages in the cell. This can then be used to determine or classify a cell as having a high likelihood or level of transient blockage compared to other cells, as follows.

Combining the (r1, r2, r3, r4) across all cells across multiple reports, construct a multi-dimensional distribution of the (r1, r2, r3, r4).

From the distribution, determine an envelope (based on a multi-dimensional Gaussian fit, for example) corresponding to the Pth percentile (for example P=75 or P=60). Points outside the envelope correspond to the reports where the reported rate of events was statistically high.

From among the points outside the envelope, it is possible to count the number of points that correspond to each cell.

Rank-order the cells based on the number of points in descending order and pick the top X % cells (for example X=5%) to mark as excessively high occurrence of transient blockages.

Figure 7A:
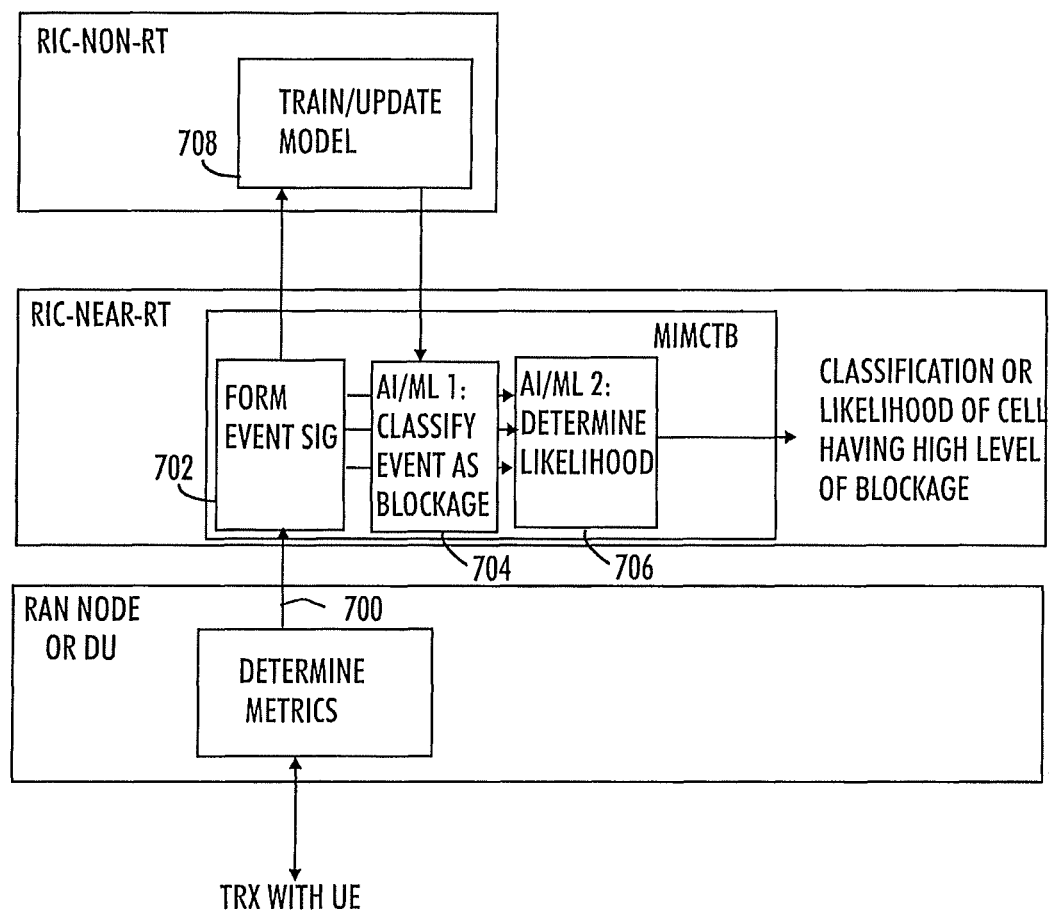
FIGS. 7A and 7B illustrate examples of embodiments.

FIG. 7A illustrates an embodiment illustrating alternative approach to step 404. In an embodiment, the MIMCTB can use Artificial Intelligence/Machine Learning (AI/ML) model to classify each potential event reported by the RAN node/DU as being a transient blockage event or not.

The metrics 700 reported by the RAN node/DU for each potential event can be formed 702 into an "event signature", which includes the sequence of channel-related or radio-related or radio-resource-management-related data/measurements/observations (for example MCS/CQI, HARQ Ack/Nacks, PUCCH DTXs, beam RSRP, L1-RSRP, received uplink signal strength, RSSI, etc.) prior to the occurrence of the event, the observations during the event for example, and the observations after the event (including whether the connection was dropped after the event).

Additionally, information on current cell conditions such as frequency, Time/Frequency Division Duplex (TDD/FDD), cell load, cell interference, and UE information, activated functionality for the UE and UE reported information such as used reference signals, MIMO, Bandwidth Parts (BWPs), CSI reporting, UE detected interference, for example, may be taken into account.

If UE has several downlink/uplink carriers activated, for example with dual connectivity or carrier aggregation, combinations of the abovementioned information relating to the carriers and UE reporting to estimate the UE overall situation may be taken into account.

This event signature can be used as input into a first AI/ML model 704 such as a neural network, which can produce a classification of whether such an event really represents a transient blockage or not. Alternatively or in addition, the AI/ML model can output a likelihood of the event representing a transient blockage.

The MIMCTB then can use the classification or likelihood 706 for each of the collection of observed events in each cell, as an input into a second model (which could be based on AI/ML as well). This second model then outputs, for one or more cells, a classification or likelihood that the cell(s) have a high level of transient blockage. This second model can use the data and/or classifications or likelihoods from multiple cells, in order to determine whether a given cell should be considered as having a high level or likelihood of transient blockage, for example to determine whether a given cell's likelihood is relatively high compared to other cells in the network, or for example to determine whether a given cell's likelihood has become higher over time compared to past determined likelihoods of transient blockage in the same cell, etc. In an embodiment, the AI/ML model can be trained or updated 708 using either offline-collected event signatures or based on ongoing collection of event signatures. The training can be performed at a RIC-non-real-time entity or ONAP (Open Network Automation Platform), for example.

In addition, it is possible to use the data for several UEs to estimate the characteristics of the duration and severity of the transient blockage, such as the mean and variance or statistical distribution. These can be useful for further updating and fine-tuning the parameters (such as time window T and T2, or parameters N1/N2/N3) that are used in identifying and classifying the degradation events.

As mentioned in step 406 above, the MIMCTB may be configured to generate a notification to a network server (for example to a network management entity) about the determination of a high level of transient blockage for one or more cells. The network server may be for example can network management system (NMS) or an Open Network Automation Platform (ONAP). The network server may be configured to invoke corrective action or countermeasures when the notification is received.

In an embodiment, corrective actions and countermeasures for the identified cells may include one or more of the following:
- Initiating a replanning of the cell to reposition the transmitter site to a different location to provide coverage in a similar area but with lower risk of transient blockage (for example move to a higher site).
- Adding a second cell in the same coverage area, for example with an additional mmWave carrier, so that UEs that do encounter the transient blockage can switch rapidly to the second cell.
- Depending on the network architecture, for example with a Centralized RAN, it may be possible to also do carrier aggregation or multi-connectivity across cells so that UEs can simultaneously connect to more than one RAN node.
- Widening the beams—some of the beamforming gain may be sacrificed in exchange for better ability to work around obstacles.
- Fine-tuning Radio Resource Management (RRM) and telecom algorithms in the RAN node and functionality activation for the UE, for example beam management (for example beam selection, beam steering, beam width (for example using wider beams), use of coarse versus refined beams, beam switching), use of reference signals, selection of MCS (for example using more robust MCS), use of SU/MU-MIMO, adapting the rank of MIMO transmissions (for example using lower rank even when users may indicate the potential of using higher rank), use of dual connectivity and carrier aggregation and selection of primary and secondary cells (for example to provide more robust alternative paths for transmitting to/from users via other cells). Any of the above may be applied to either all UEs in the cell, or to subsets of UEs such as specific type of UEs, for example based on UE type number, software version, or based on QoS profiles, or subscription profiles of the UEs, for example.

As mentioned in step 420 above, the MIMCTB may be configured to control reception from the network, of data on user equipment served by one of the one or more RAN nodes.

In an embodiment, the MIMCTB may receive from a core network function (such as an AMF or SMF) a persistent identifier of the UE or an identifier of a class to which the UE belongs.

The identity used by the Radio Access Network RAN is typically transitory—only lasts for the duration of an RRC connection—subsequent connections by the same UE in the same cell or by the same UE in a different cell get different RAN-level connection identifiers. However, the core network identifiers can be persistent or long-lasting across multiple connections by a UE in multiple cells. The persistent identifier of the UE is typically available at the core network. In an embodiment, the persistent identifier of the UE can be for example International Mobile Equipment Identity (IMEI) or device identity, or International Mobile Subscriber Identity (IMSI), for example.

In some cases, a persistent but not permanent identifier such as Global Unique Temporary Identifier (GUTI) may also be used. The GUTI can be changed by the core network at any time, but the core network knows the true (permanent) identity of the UE and can map the GUTI to a permanent identifier whenever needed. The use of a persistent but not permanent identifier such as GUTI helps provide some additional privacy protection for a UE but may require additional mapping functions.

The identifier of class to which a UE belongs may be for example the UE type/software version/manufacturer and model/chipset version, for example.

To get the identifier of the UE or the class of the UE, the MIMCTB may be configured to query a suitable core network function, such as an AMF or SMF which has access to this information. The core network function will return the requested information, possibly after authorization checks.

The MIMCTB can use the persistent identifier to associate the metrics or statistics of a given UE (or class of UE) across multiple connections by the UE in same cell or in multiple cells. For example, all connections which have the same persistent identifier can be treated as related to the same UE, and thus the MIMCTB can accumulate or correlate the metrics/statistics of different connections of the same UE.

As mentioned in step 422 above, the MIMCTB may be configured to determine, based on the data received from the network in step 420 and the one or more RAN nodes in step 402, likelihood that user equipment have a high level of transient blockages.

An example solution for the MIMCTB to perform this determination is provided below. The solution may be implemented utilising machine learning algorithm, for example. It is assumed that the information is provided in the form of lists as described above. MIMCTB can do the following:

For each UE i which was included in the reports:
  Based on the persistent UE identifier, collect all the events corresponding to that UE from the various reports from various cells.
  For each event E in each list reported for UE i (possibly from various cells):
    Select events for further consideration as transient beam degradation, depending on (i) whether the channel conditions prior to the event were sufficiently good or not (ii) whether the event was followed by a connection loss. For example, select event if the last MCS prior to the occurrence was at least a minimum value M, and the last signal strength or L1-RSRP prior to the event was at least a minimum value S. If channel conditions were not sufficiently good, or if the event was followed by a connection loss, then it may indicate that the UE was already relatively in poor channel conditions prior to the beam degradation event detection, and hence it is not suitable to classify this as a "transient" beam degradation", hence such events can be excluded from further processing.
  Let (r1, r2, r3, r4,) be the counts of events that were marked as transient blockages in the lists (L11, L12, L13, L1, . . . ) respectively, divided by the total time duration of the connection(s) of the UE. This can be viewed as a "rate of transient beam degradations per unit time" for user i.
  Combining the (r1, r2, r3, r4, . . . ) across all UEs across multiple reports, Construct a multi-dimensional distribution of the (r1, r2, r3, r4, . . . ).
  From the distribution, determine an envelope (based on a multi-dimensional Gaussian fit, for example) corresponding to the Pth percentile (for example P=75 or P=60). Points outside the envelope correspond to the reports where the reported rate of events was statistically anomalously high.
  Rank-order the UEs which lie outside the envelope. These are the UEs which may be considered as having excessively or anomalously high occurrence of beam degradations.
  From these UEs, if desired, further pick the top X % UEs (for example X=5% or X=10%) based on the total rate across all types of events (i.e. based on sum (r1+r2+ . . . )).
  Among the UEs thus identified, it is possible to further examine whether the events are anomalously high in one particular cell, or whether the events occur with reasonable regularity across multiple cells. For example, similar to the above procedure, for each UE i, for each cell j, calculate the rate (r1(j), r2(j), . . . ) considering only the events reported for UE i in cell j. Then it is possible to examine whether the rate was unnaturally high in one or a few cells compared to the rest of the cells for example by examining the coefficient of variation of sum(r1(j)+r2(j)+ . . . ). The coefficient of variation of a set of numbers is defined as the ratio of the standard deviation to the mean. If the coefficient of variation is high, for example more than 0.5, then the rate of events may be considered as being very different from cell to cell (indicating that the UE has a much larger rate of events in some cells than in other cells). On the other hand, if the coefficient of variation is low, the UE may be assumed to have a reasonably spread out occurrence of beam degradations across many cells. The UEs with the latter property may thus be identified or classified as having high level or likelihood of transient beam degradations, while for the UEs with the former property, it may be considered that the UE's behavior in a few cells is bad but not overall—in this case the cell may also be examined as potentially being anomalous rather than the UE.

Figure 7B:
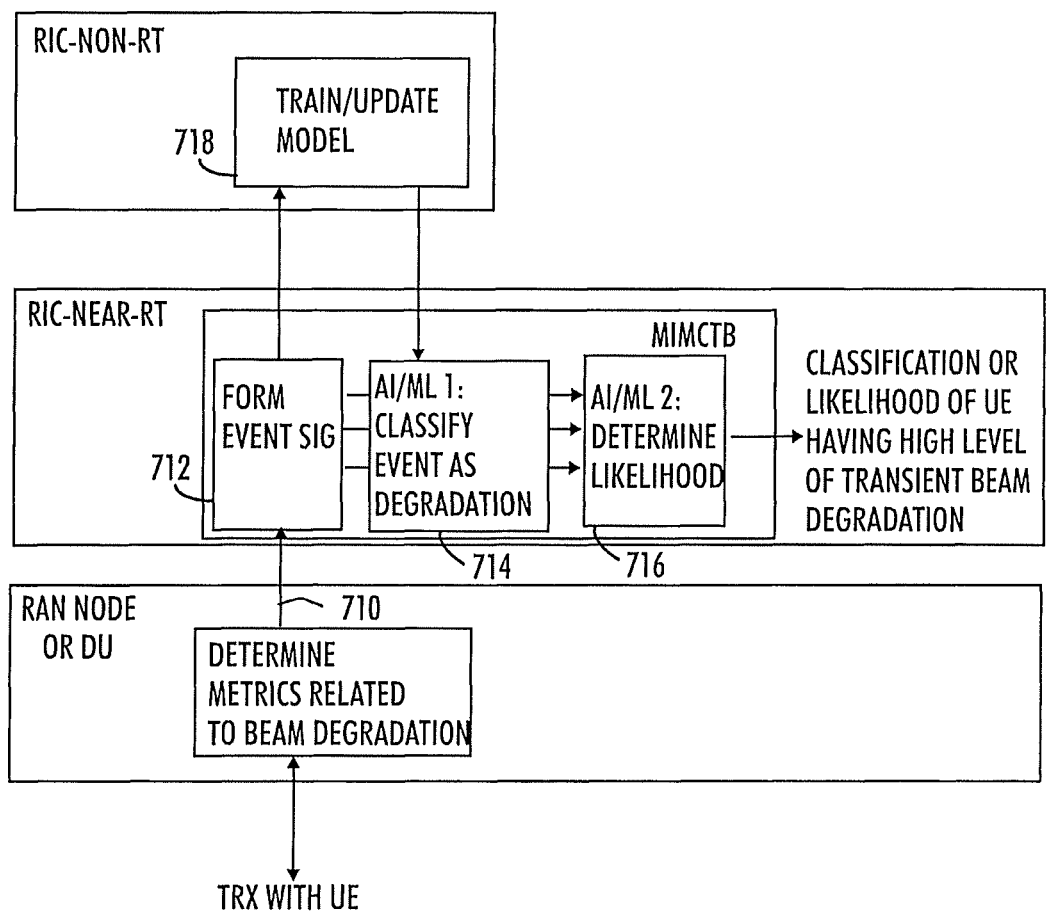

FIG. 7B illustrates an embodiment illustrating alternative approach to step 422. In an embodiment, the MIMCTB can use an Artificial Intelligence/Machine Learning (AI/ML) model to classify each potential event reported by the RAN node/DU as being a transient beam degradation event or not.

Similarly as above in connection with the example of FIG. 7A, the metrics 710 reported by the RAN node/DU for each potential event can be formed 712 into an "event signature", which includes the sequence of MCS/CQI prior to the occurrence, the observations during the event (for example HARQ ACK/NACKs or PUCCH DTXs, or other channel/radio/radio-resource-management-related attributes mentioned earlier, for example), and observations after the event, including whether the connection was dropped after the event.

In addition, information on current cell characteristics and conditions such as frequency, TDD/FDD, cell load, cell interference, and UE information, activated functionality for the UE and UE reported information such as UE power headroom, used reference signals, MIMO, BWPs, CSI reporting, UE detected interference, for example, may be taken into account.

If UE has several downlink/uplink carriers activated, for example with dual connectivity or carrier aggregation combinations of the above-mentioned information relating to the carriers and UE reporting to estimate the UE overall situation may be taken into account.

The event signature can be used as input into a first AI/ML model 714 such as a neural network, which can produce a classification of whether such an event really represents a transient beam degradation or not. Alternatively, the AI/ML model can output a likelihood (rather than a classification) of the event representing a transient beam degradation.

Moreover, the data of several UEs may be used to estimate the characteristics of the duration and severity of a transient blockage, such as the mean and variance or statistical distribution. These can be useful for further updating and fine-tuning the parameters (for example time window T and T2, or parameters N1/N2/N3 etc) that are used in identifying and classifying the degradation events. Additional decisions can also be made on carrier aggregation, UE CSI reporting interval, for example.

The MIMCTB then can use the classification or likelihood for each of the collection of observed events in each UE, as input into a second model 716 (which could be based on AI/ML as well). This second model then outputs, for one or more cells, a classification or likelihood that the UE(s) have a high level of transient blockage.

In an embodiment, the AI/ML models can be trained or updated 718 using either offline-collected event signatures or based on ongoing collection of event signatures. The training can be performed at a RIC-non-real-time entity or ONAP (Open Network Automation Platform), for example.

As mentioned in step 424 above, the MIMCTB may be configured to generate a notification to a network server (such as a network management entity) about the determination of a high level of transient beam degradation for one or more UEs. The network server can be, for example, a network management system (NMS) or an Open Network Automation Platform (ONAP). In an embodiment, the persistent identifier(s) of the UE(s) can be provided along with the notification. In an embodiment, the network server may be configured to invoke corrective action or countermeasures when the notification is received.

The network server may also be configured to further use an accumulation counter to keep track of the number of beam degradation notifications received for a UE over time, or a fraction of the number of degradation notifications relative to the total connected duration of a UE (which may be considered as a "rate of beam degradation notifications"). For the UEs for which this is high, corrective action can be invoked.

Corrective actions and countermeasures for the identified UEs may include following actions, for example:

- Updating or modifying the UE's subscription profile or an IMEI registry to mark the UE as being known to have poor performance with respect to beam degradation.
- Instructing the RAN, based on the updated subscription profile, to treat the UE differently for subsequent connection attempts. For example, the RAN may be instructed to use more robust transmission parameters, more robust beam selection mechanisms (for example use of wider beams), UE's CSI reporting interval, more aggressively invoking Carrier aggregation/Dual connectivity to provide robust alternative paths, to name a few.
- If a sufficiently high number (or fraction) of UEs of a particular class (for example same manufacturer/model or same chipset version etc.) display significant transient beam degradation behavior, the operator can take up the issue with the manufacturer or chipset vendor, in order to request improvements or testing/validation.
- The operator may try to provide promotional advertising to the user of the UE for example to upgrade the UE to a better performing UE in order to improve the user experience, or may provide offers to modify the billing/subscription plan commensurate with the performance being experienced by the user.

Figure 8A:
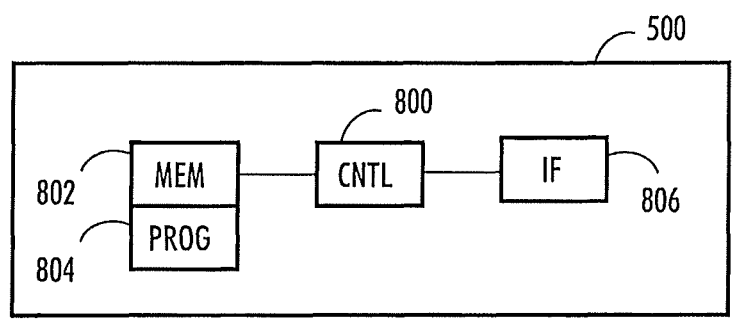
FIGS. 8A and 8B illustrate examples of apparatuses.

FIG. 8A illustrates an embodiment. The figure illustrates a simplified example of an apparatus applying embodiments of the invention. In some embodiments, the apparatus may be MIMCTB located in a RAN node or in DU of a RAN node.

It should be understood that the apparatus is depicted herein as an example illustrating some embodiments. It is apparent to a person skilled in the art that the apparatus may also include other functions and/or structures and not all described functions and structures are required. Although the apparatus has been depicted as one entity, different modules and memory may be implemented in one or more physical or logical entities.

The apparatus 500 of the example includes a control circuitry 800 configured to control at least part of the operation of the apparatus.

The apparatus may include a memory 802 for storing data. Furthermore, the memory may store software 804 executable by the control circuitry 800. The memory may be integrated in the control circuitry.

The apparatus may include one or more interface circuitries 806. The interface circuitries are operationally connected to the control circuitry 800. An interface circuitry may enable the apparatus to communicate with other network elements.

In an embodiment, the software 804 may include a computer program including program code means adapted to cause the control circuitry 800 of the apparatus to realise at least some of the embodiments described above.

Figure 8B:
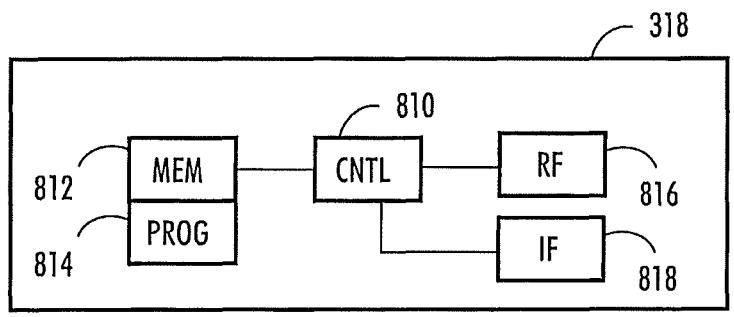

FIG. 8B illustrates an embodiment. The figure illustrates a simplified example of an apparatus applying embodiments of the invention. In some embodiments, the apparatus may be a RAN node or a part of a RAN node.

It should be understood that the apparatus is depicted herein as an example illustrating some embodiments. It is apparent to a person skilled in the art that the apparatus may also include other functions and/or structures and not all described functions and structures are required. Although the apparatus has been depicted as one entity, different modules and memory may be implemented in one or more physical or logical entities.

The apparatus 318 of the example includes a control circuitry 810 configured to control at least part of the operation of the apparatus.

The apparatus may include a memory 812 for storing data. Furthermore, the memory may store software 814 executable by the control circuitry 810. The memory may be integrated in the control circuitry.

The apparatus may include one or more interface circuitries 816, 818. The interface circuitries are operationally connected to the control circuitry 801. An interface circuitry 818 may enable the apparatus to communicate with other network elements. An interface circuitry 816 may be a set of transceivers configured to communicate with UEs of a wireless communication network. The interface circuitry 816 may be connected to an antenna arrangement (not shown). The apparatus may also include a connection to a transmitter instead of a transceiver.

In an embodiment, the software 814 may include a computer program including program code means adapted to cause the control circuitry 800 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may include a working memory (random access memory, RAM), a central processing unit (CPU), and a system clock. The CPU may include a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium such as a non-transitory computer readable medium, including program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus in a communication system includes means configured to control transmission to one or more Radio Access Network RAN nodes of parameters for the one or more RAN node to detect occurrences of sharp channel degradation events in connections served by the node; control reception from the one or more RAN nodes of data related to channel or transmission events related to detected sharp channel degradation in connections served by the node; determine, based on the received data, likelihood that one or more RAN nodes have a high level of transient blockages.

In an embodiment, an apparatus in a communication system includes means configured to control reception of parameters for the apparatus to detect occurrences of sharp channel degradation events in connections served by the apparatus; detect one or more sharp channel degradation events; gather data related to the one or more events; control transmission of data related to channel or transmission events related to detected sharp channel degradation in connections served by the apparatus.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
   at least one processor; and
   at least one non-transitory memory including computer program code comprising instructions, where the instructions, when executed by the at least one processor, are configured to cause the apparatus to:
   control reception of parameters for the apparatus to detect occurrences of sharp channel degradation events in connections served by the apparatus within a cell;
   detect, within the cell, one or more occurrences of sharp channel degradation events using the received parameters;
   gather, within the cell, data on channel or transmission events corresponding to the one or more detected sharp channel degradation events;
   control, within the cell, transmission of data on the channel or transmission events related to detected sharp channel degradation in connections served by the apparatus;
   wherein detecting the one or more occurrences of sharp channel degradation events includes at least two of the following:
   use a time duration T for measurements, where T is a part of the parameters;
   determine that the number of steps by which modulation and coding scheme was reduced within the time duration T exceeds a number N1, where N1 is a part of the parameters;
   determine that a length of a sequence of consecutive discontinuous transmissions exceeds a value N2, where N2 is a part of the parameters;
   determine that a length of a sequence of consecutive negative feedback transmissions exceeds a value N3, where N3 is a part of the parameters;
   determine that a fraction of negative feedback transmissions to total number of feedback transmissions exceeds a value F1 within the time duration T, where F1 is a part of the parameters;
   determine that a fraction of uplink discontinuous transmissions on uplink control channel to total number of transmissions within the time duration T exceeds a value F2, where F2 is a part of the parameters;
   determine a minimum modulation and coding scheme of user terminal before occurrence of sharp channel degradation;
   determine a sequence of channel-related or radio-related or radio-resource-management-related measurements before and during the occurrence of sharp channel degradation;
   determine a minimum signal level for user equipment before occurrence of sharp channel degradation; and
   for each event E reported for user equipment in a communication system:
   determine a maximum duration of time T2 between events E1 and E2, where:
   E1 is an event where the user equipment reports a second beam as its strongest beam where the second beam is not a neighboring beam of a previous strongest first beam, with the signal level of the second beam being significantly less than the first beam, and E2 is an event where the user equipment reports a third beam as its strongest beam where the third beam is a neighboring beam of the first beam, with the signal level of the third beam being significantly better than the signal level of the second beam, and where T2, E1 and E2 are part of the parameters.

2. The apparatus of claim 1, wherein the data on channel or transmission events related to sharp channel degradation comprises at least one of:
   data on channel or transmission events prior to the channel degradation event occurrence;
   data on channel or transmission events during the channel degradation event occurrence; or
   data on channel or transmission events after the channel degradation event occurrence.

3. The apparatus of claim 1, wherein the data on channel or transmission events related to detected sharp channel degradation in connections comprise one or more of the following:
   a list of entries, each corresponding to an occurrence where a modulation and coding scheme of user terminal was reduced by more than N1 steps within the time duration;
   a list of entries, each corresponding to an occurrence where for a user equipment, there was a sequence of consecutive discontinuous transmissions of length at least N2;
   a list of entries, each corresponding to an occurrence where for a user equipment, there was a sequence of consecutive of hybrid automatic repeat request negative feedbacks of length at least N3; or
   a list of entries, each corresponding to an occurrence where for a user equipment, beam switch events E1 and E2 happened within a time T2.

4. The apparatus of claim 1, wherein the data related to channel, or transmission events related to detected sharp channel degradation in connections comprise one or more of the following:
   a sequence of one or more signal levels prior to, during or after each corresponding occurrence;
   sequence of one or more modulation and coding schemes used for transmission to or from the user terminal and/or channel quality index prior, during or after each occurrence; or
   an indication whether the connection was dropped after the occurrence.

5. The apparatus of claim 1, wherein the data on channel or transmission events related to detected sharp channel degradation in connections comprise one or more of the following:
   a RAN-level user equipment identifier for an associated UE user equipment.

6. A method in an apparatus in a communication system, the method comprising:
   controlling reception of parameters for the apparatus to detect occurrences of sharp channel degradation events in connections served by the apparatus within a cell;
   detecting, within the cell, one or more occurrences of sharp channel degradation events using the received parameters;
   gathering, within the cell, data on channel or transmission events corresponding to the one or more detected sharp channel degradation events;
   controlling, within the cell, transmission of data on the channel or transmission events related to detected sharp channel degradation in connections served by the apparatus;
   wherein detecting the one or more occurrences of sharp channel degradation events includes at least two of the following:
      use a time duration T for measurements, where T is a part of the parameters;
      determining that the number of steps by which modulation and coding scheme was reduced within the time duration T exceeds a number N1, where N1 is a part of the parameters;
      determining that a length of a sequence of consecutive discontinuous transmissions exceeds a value N2, where N2 is a part of the parameters;
      determining that a length of a sequence of consecutive negative feedback transmissions exceeds a value N3, where N3 is a part of the parameters;
      determining that a fraction of negative feedback transmissions to total number of feedback transmissions exceeds a value F1 within the time duration T, where F1 is a part of the parameters;
      determining that a fraction of uplink discontinuous transmissions on uplink control channel to total number of transmissions within the time duration T exceeds a value F2, where F2 is a part of the parameters;
      determining a minimum modulation and coding scheme of user terminal before occurrence of sharp channel degradation;
      determining a sequence of channel-related or radio-related or radio-resource-management-related measurements before and during the occurrence of sharp channel degradation;
      determining a minimum signal level for user equipment before occurrence of sharp channel degradation; and
      for each event E reported for user equipment in a communication system:
   determining a maximum duration of time T2 between beam switch events E1 and E2, where:
      E1 is an event where the user equipment reports a second beam as its strongest beam where the second beam is not a neighboring beam of a previous strongest first beam, with the signal level of the second beam being significantly less than the first beam, and
      E2 is an event where the user equipment reports a third beam as its strongest beam where the third beam is a neighboring beam of the first beam, with the signal level of the third beam being significantly better than the signal level of the second beam, and where T2, E1 and E2 are part of the parameters.

7. The method of claim 6, wherein the data on channel or transmission events related to sharp channel degradation comprises at least one of:
   data on channel or transmission events prior to the channel degradation event occurrence;
   data on channel or transmission events during the channel degradation event occurrence; or
   data on channel or transmission events after the channel degradation event occurrence.

8. The method of claim 6, wherein the data on channel or transmission events related to detected sharp channel degradation in connections comprise one or more of the following:

a list of entries, each corresponding to an occurrence where a modulation and coding scheme of user terminal was reduced by more than N1 steps within the time duration;

a list of entries, each corresponding to an occurrence where for a user equipment, there was a sequence of consecutive discontinuous transmissions of length at least N2;

a list of entries, each corresponding to an occurrence where for a user equipment, there was a sequence of consecutive of hybrid automatic repeat request negative feedbacks of length at least N3; or a list of entries, each corresponding to an occurrence where for a user equipment, said beam switch events E1 and E2 happened within a time T2.

9. The method of claim 6, wherein the data related to channel or transmission events related to detected sharp channel degradation in connections comprise one or more of the following:

a sequence of one or more signal levels prior to, during or after each corresponding occurrence;

sequence of one or more modulation and coding schemes used for transmission to or from the user terminal and/or channel quality index prior, during or after each occurrence; or an indication whether the connection was dropped after the occurrence.

10. The method of claim 6, wherein the data on channel or transmission events related to detected sharp channel degradation in connections comprise one or more of the following:

a RAN-level user equipment identifier for an associated user equipment.

11. A non-transitory computer readable medium comprising instructions for causing an apparatus to at least perform:

controlling reception of parameters for the apparatus to detect occurrences of sharp channel degradation events in connections served by the apparatus within a cell;

detecting, within the cell, one or more occurrences of sharp channel degradation events using the received parameters;

gathering, within the cell, data on channel or transmission events corresponding to the one or more detected sharp channel degradation events;

controlling, within the cell, transmission of data on the channel or transmission events related to detected sharp channel degradation in connections served by the apparatus;

wherein detecting the one or more occurrences of sharp channel degradation events includes at least two of the following:

use a time duration T for measurements, where T is a part of the parameters;

determining that the number of steps by which modulation and coding scheme was reduced within the time duration T exceeds a number N1, where N1 is a part of the parameters;

determining that a length of a sequence of consecutive discontinuous transmissions exceeds a value N2, where N2 is a part of the parameters;

determining that a length of a sequence of consecutive negative feedback transmissions exceeds a value N3, where N3 is a part of the parameters;

determining that a fraction of negative feedback transmissions to total number of feedback transmissions exceeds a value F1 within the time duration T, where F1 is a part of the parameters;

determining that a fraction of uplink discontinuous transmissions on uplink control channel to total number of transmissions within the time duration T exceeds a value F2, where F2 is a part of the parameters;

determining a minimum modulation and coding scheme of user terminal before occurrence of sharp channel degradation;

determining a sequence of channel-related or radio-related or radio-resource-management-related measurements before and during the occurrence of sharp channel degradation;

determining a minimum signal level for user equipment before occurrence of sharp channel degradation; and for each event E reported for user equipment in a communication system:

determining a maximum duration of time T2 between events E1 and E2, where:

E1 is an event where the user equipment reports a second beam as its strongest beam where the second beam is not a neighboring beam of a previous strongest first beam, with the signal level of the second beam being significantly less than the first beam, and E2 is an event where the user equipment reports a third beam as its strongest beam where the third beam is a neighboring beam of the first beam, with the signal level of the third beam being significantly better than the signal level of the second beam, and where T2, E1 and E2 are part of the parameters.

* * * * *